DISTORTION REDUCTION IN TIME DIVISION MULTIPLEX SYSTEMS

Filed Feb. 15, 1951 3 Sheets-Sheet 1

INVENTORS
WILLIAM D. HOUGHTON
& CLARENCE W. HANSELL
BY
Charles H. Brown
ATTORNEY INVENTORS
WILLIAM D. HOUGHTON
& CLARENCE W. HANSELL
BY
Charles H. Brown
ATTORNEY

DISTORTION REDUCTION IN TIME DIVISION MULTIPLEX SYSTEMS

Filed Feb. 15, 1951

INVENTORS
WILLIAM D. HOUGHTON
& CLARENCE W. HANSELL
BY
Charles H. Brown
ATTORNEY United States Patent Office 2,763,721

Patented Sept. 18, 1956

2,763,721

DISTORTION REDUCTION IN TIME DIVISION MULTIPLEX SYSTEMS

Clarence W. Hansell, Port Jefferson, N. Y., and William D. Houghton, Princeton, N. J., assignors to Radio Corporation of America, a corporation of Delaware Application February 15, 1951, Serial No. 211,138

12 Claims. (Cl. 179—15)

This invention relates to novel methods of and means for reducing distortion in time division multiplex systems.

A time division multiplex system is one in which a common transmtting medium, such as a radio circuit or wire line, is sequentially assigned to a number of different intelligence carrying channels for different time periods. The composite time division multiplex signal consists of a train of signal pulses each of which may be modulated in accordance with a different message wave signal. The manner in which the modulation may be applied to the different pulses depends upon the operational requirements of the system.

It has been proposed in one type of time division multiplex system to produce a pulse train signal consisting of a number of intelligence modulated pulses by sampling the message waves for short intervals. In such a system, distortion is introduced due to the message waves being translated through a non-linear portion of the sampling tube characteristic as the sampling tube is brought from a completely cut-off condition to the linear operating condition, and vice versa.

If the time of passage from one operating condition to the other is made infinitesimal, then the distortion introduced by sampling becomes infinitesimal. However, in practical systems, a finite time is required to pass from one condition to the other and, therefore, distortion is introduced in the pulse sample.

It is an object of this invention to provide novel methods of and means for removing the distortion due to sampling by purposely introducing distortion of a character such as to balance or cancel the undesired distortion.

It is another object of the invention to provide novel methods of and means for introducing a predetermined amount of distortion into a pulse type signal to remove the distortion inherently introduced by a sampling operation.

Still another object of the invention is to provide novel methods of and means for reducing the distortion introduced into a time division multiplex signal due to sampling, by gating the original samples with shorter steep sided gating pulses and then introducing distortion into the resulting pulse signal having such character as to cancel the undesired distortion produced by the shorter gating pulses.

A further object of the invention is to provide novel methods of and means for reducing distortion introduced by sampling in time division multiplex receivers by first sampling the received pulses with short duration pulses, introducing distortion to cancel the distortion resulting from the sampling and then selecting the different samples by means of a number of channel units which are actuated by gate pulses which are of longer duration than the sample pulses.

A still further object is to sample with shorter duration pulses and introduce distortion in a circuit common to all channel pulses to cancel distortion caused by the sampling, in all channels.

Briefly, in accordance with the invention, the original signal pulses are applied to an amplifier whose anode voltage is reduced to a low value so that it operates on a non-linear portion of its characteristic such that a predetermined amount of distortion is produced in the output pulse train signal. At the transmitter, separate pulse trains are produced by sampling and are combined in spaced time relationship to produce a composite pulse train. The composite train is sampled and distortion then deliberately introduced after the second sampling so that an accurate pulse train is transmitted. At the receiver, the introduced distortion may be added prior to sampling so that the later sampled pulses are accurate.

The above and other objects and advantages of the invention will become apparent upon a consideration of the following detailed description of the invention taken in conjunction with the drawing in which:

Fig. 1 is a schematic diagram of a sampling circuit which may be used in conjunction with the invention;

Figs. 1*a* through 1*e* are curves which are illustrative of the operation of the circuit shown in Fig. 1;

Figure 4:
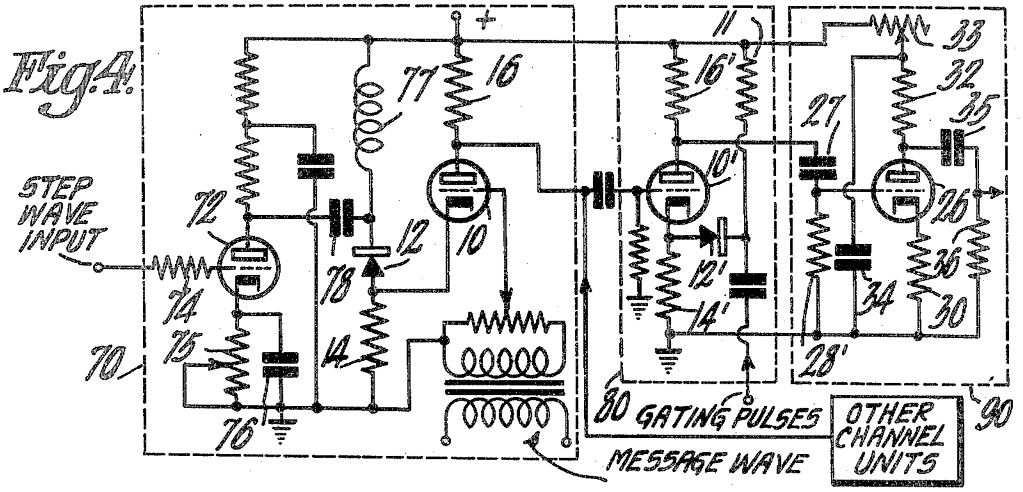
Fig. 4 illustrates schematically an embodiment of the invention as applied to a transmitting unit.
Figure 4A:
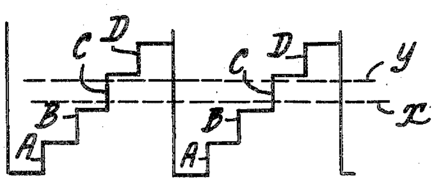
Figures 4B, 4C, 4D, 4E:
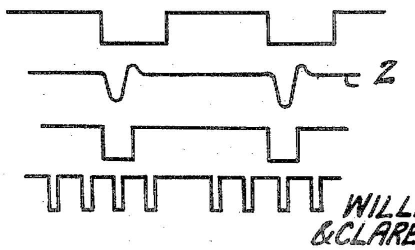
Figure 5:
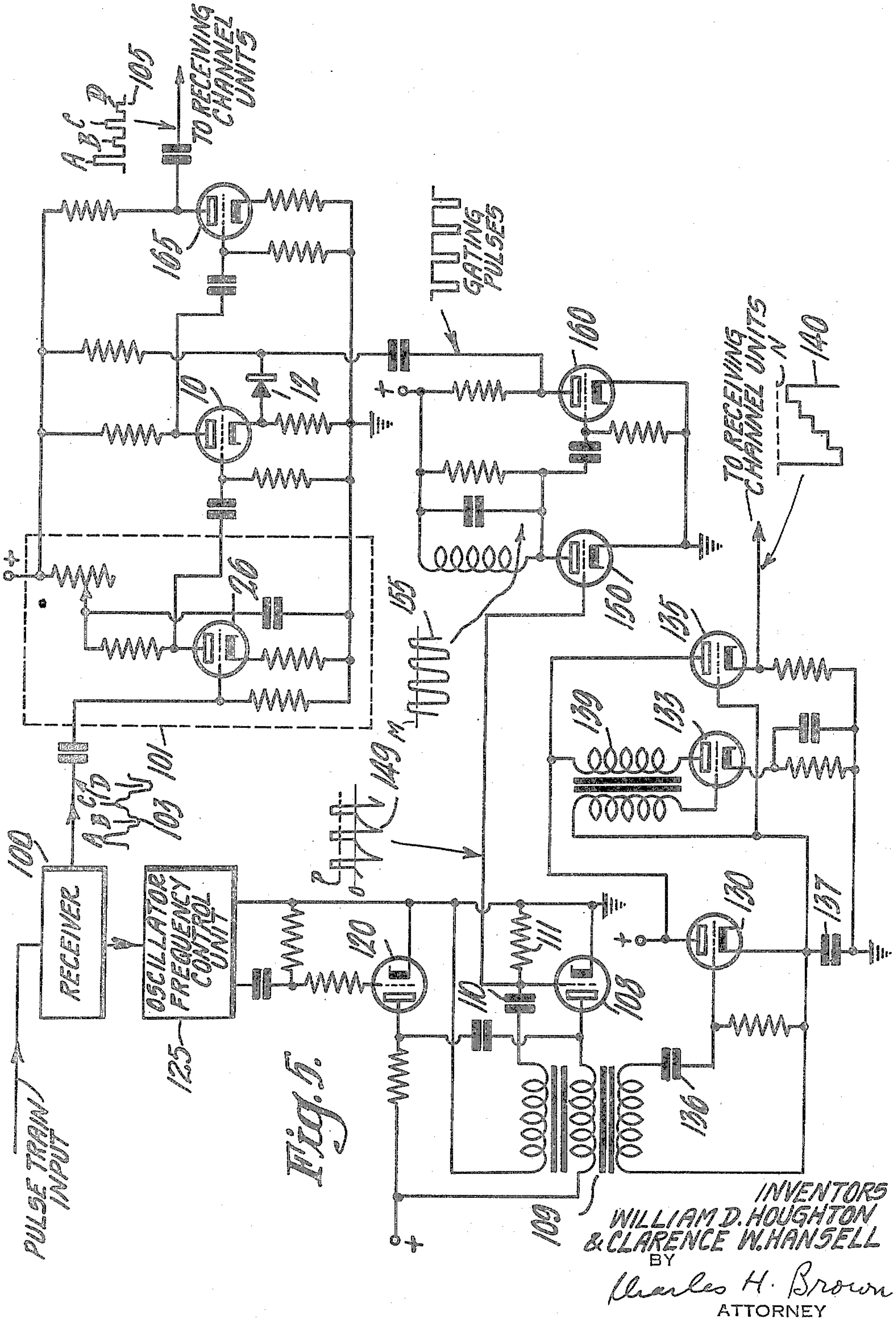

Figs. 4*a* through 4*e* are curves which are illustrative of the operation of the arrangement shown in Fig. 4; and, Fig. 5 illustrates schematically an embodiment of the invention as applied to a receiving unit.

Time division multiplex systems using sampling techniques have been employed for various types of communication such as telegraphy and telephony, and more lately in television. For purposes of simplicity, the invention will be described in connection with a telephone system. It is to be understood, however, that the principles of the invention are not limited to the particular embodiment chosen for purposes of illustration. The application of the principles of the invention to other embodiments and systems will be clear.

Figure 1:
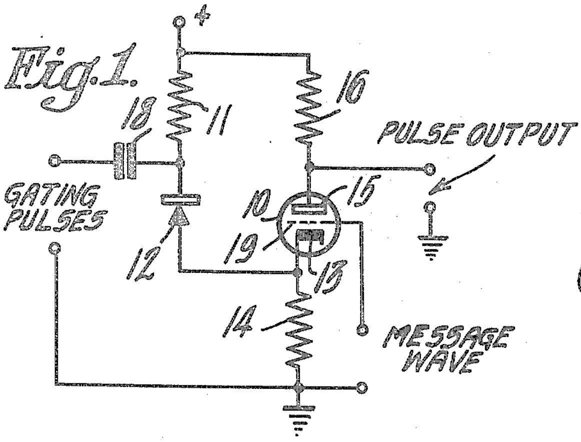

In order to understand the manner in which distortion is inherently produced in sampling apparatus reference may be had to Fig. 1. The particular sampling arrangement shown is for illustration only. It will be clear that the same distortion problem exists in other sampling arrangements. A sampling or gating vacuum tube 10 is shown having in shunt with a portion of its space discharge path a series connected resistor 11 and a diode 12. The sampling tube cathode 13 is returned to ground by the unbypassed resistor 14. The anode 15 of the sampling tube receives its potential from the positive terminal of a unidirectional current source through a load resistor 16. Gating pulses, derived from a source not shown, are applied to the junction of the resistor 11 and the diode 12 through a coupling condenser 18. The diode 12 is so poled as to permit current to flow therethrough and through resistor 14 thus producing an IR drop through resistor 14 of a value sufficient to bias tube 10 to the anode current cutoff condition, in the absence of a gating pulse. The gating pulses may be derived from conventional circuits and are applied at a frequency which will provide the desired sampling rate. The message wave is applied to the control electrode 19 of the sampling tube 10 and the pulse output is taken from the anode 15 of the sampling tube.

The operation of this circuit is as follows: Current normally flowing through the cathode resistor 14, the diode 12 and the resistor 11 is made to have a magnitude such that the voltage developed across the cathode resistor 14 is sufficient to cause the sampling tube 10 to be biased beyond cut-off for all levels of signals applied to the control electrode 19.

The negative gating pulses applied to the circuit have an amplitude sufficient to reduce the anode voltage of the diode 12 to a value lower than that on its cathode. Each gating pulse, therefore, causes the diode 12 to cease conducting, as a result of which the biasing voltage is removed from the sampling tube 10. For the time interval during which the diode 12 is non-conducting, the sampling tube 10 operates as a linear amplifier (Class A) with its cathode resistor 14 as a cathode de-generation resistor. Thus, negative pulses with a time duration equal to the cut-off of the diode 12 and with an amplitude determined by the amplitude of the message wave applied to the control electrode 19 are developed across the load resistor 16.

Figure 1A:
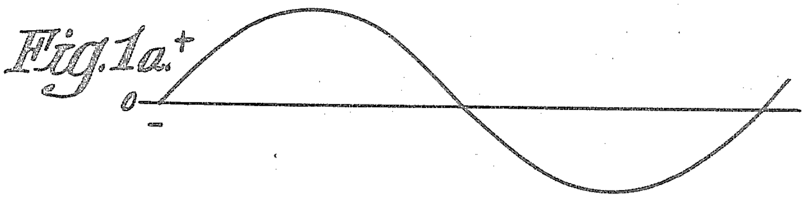
Figure 1B:
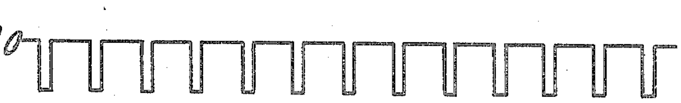
Figure 1C:
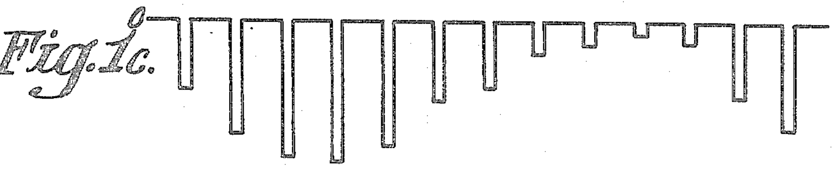

For the purpose of further clarifying the operation of this arrangement, reference is made to Figs. 1*a* through 1*c*. In each of these figures, curves are plotted with amplitude as ordinates and time as abscissa. The curves are not to scale but are merely representative of the operation of the circuit of Fig. 1.

Fig. 1*a* represents an assumed message wave which is applied to the control electrode 19 of the sampling tube, Fig. 1*b* represents the series of gating pulses applied to the input of the sampling tube circuit, and Fig. 1*c* represents the output pulses appearing across the load resistor 16. From a consideration of these curves and the operation of the circuit of Fig. 1, as explained above, the manner in which the sampled pulses of varying amplitude are produced will be clear.

Keeping in mind the normal tube characteristic of an amplifying tube it will be clear that the sampling tube 10 must pass through a condition of non-linear amplification in order to be cut-off at one time interval and to be in a linear amplifying condition at another time interval. The effect of this passage through a condition of non-linear amplification has been shown in Fig. 1*d*. In that figure, a single output pulse of Fig. 1*c* has been shown expanded in time. The dotted lines represent the limits of amplitude variations in the output pulses caused by the message wave amplitude variation. The time intervals $t_1$ to $t_2$ and $t_5$ to $t_6$ indicate the time periods during which the sampling tube 10 is passing through its non-linear condition. The time interval $t_2$ to $t_5$ indicates the linear operating time. Therefore, the pulse of Fig. 1*d* contains a distorted sample of the signal at times $t_1$ to $t_2$ and $t_5$ to $t_6$, whereas the sample may be distortionless during the time interval $t_2$ to $t_5$. If the time intervals $t_1$ to $t_2$ and $t_5$ to $t_6$ are made extremely short compared to the total pulse time $t_1$ to $t_6$, then the resulting distortion can be made small. However, it is impossible to remove the distortion completely since a finite time is required to pass from one condition to the other.

As the number of channels employed in a time division multiplex system increases, the problem of producing channel pulses in which the times $t_1$ to $t_2$ and $t_5$ to $t_6$ are short compared to the total pulse time becomes more difficult. In order to overcome this difficulty, a system known as "double gating" has been used. In such systems, pulses which may be produced by an arrangement such as shown in Fig. 1 from a plurality of individual channel units are combined to form a composite pulse signal train. Each of the pulses of the train are sampled by a common circuit producing shorter duration pulses which have built-up and decay times which are short compared to the pulse duration.

Figures 1D, 1E:
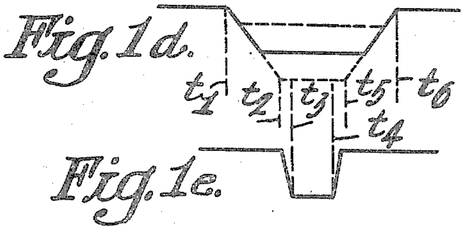

The manner in which distortion is thus reduced will be clear from a consideration of Figs. 1*d* and 1*e*. It will be noted that the second sampling pulse occurs during the linear time of the pulse produced by the first sample and hence the distortion introduced in the channel pulse at times $t_1$ to $t_2$ and $t_5$ to $t_6$ is eliminated. It will also be noted that the ratio of build-up and decay time to total pulse duration time is considerably less in the second sampling pulse than in the channel pulse. The net result is a decrease in the distortion produced by sampling.

Furthermore since, as explained above, the composite pulse train contains pulses from all channels and since the second sampling is performed by a common sampling circuit, the distortion produced in all output pulses is identical in character and thus may be balanced out in accordance with the invention by a distortion balance circuit common to all sample pulses.

Figure 2:
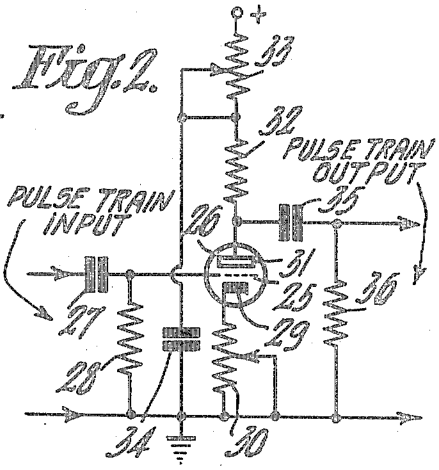
Fig. 2 represents schematically an embodiment of the invention.

I have found that the major portion of the distortion produced by sampling bears a second harmonic relationship with the modulating signal. According to the present invention, the inherent distortion is balanced by introducing, in a circuit common to all channels and in tandem with the sampling or gating circuit, distortion of a character such as to cancel the undesired distortion due to sampling. Keeping in mind the above description of the causes for distortion being present and the character of the distortion, there are several possible means in accordance with the invention for introducing the balancing distortion. One circuit, constructed in accordance with the invention, which has proved satisfactory in practice, is shown in Fig. 2. In that embodiment, the pulse train signal is applied to the control electrode 25 of an amplifier vacuum tube 26 through an input circuit comprising a coupling condenser 27 and a grid resistor 28. The cathode 29 of the amplifying tube 26 is returned to ground through the cathode resistor 30. The anode 31 of the amplifying tube 26 is connected to the positive terminal of a source of potential through a resistor 32 and a voltage dropping potentiometer 33. Resistors 32 and 33 may, of course, form parts of a single unit. The junction of the line resistor 32 and the potentiometer 33 is bypassed to ground through a condenser 34. The output is taken from the anode 31 of the amplifying tube 26 by means of a condenser 35 and a load resistor 36. By adjusting the voltage dropping potentiometer 33 so that the anode potential is relatively low and selecting the cathode resistor 30 so as to limit its linearity control to a predetermined degree, the amplifying tube 26 may be made to operate with a characteristic that will cause it to introduce a distortion into the signal pulse train that will balance the distortion produced by sampling. Any suitable indicator, such as an oscilloscope or distortion meter can be used to determine when the proper amount of distortion has been introduced, merely by adjusting the potentiometers 30 and 33 and observing the results on the indicating instrument.

As an example of one arrangement that has proved satisfactory in reducing the distortion from 5% to less than 1% at 100% modulation, the components of the arrangement of Fig. 2 were given the following values when a type 6SN7 tube was used for tube 26:

| Element: | | Value |
|---|---|---|
| Cathode resistor **30** | ohms | 1000 |
| Load resistor **32** | do | 4700 |
| Voltage reducing potentiometer **33** | do | 250,000 |
| Shunting condenser **34** | μf | 10 |

Another manner in which distortion may be introduced is by the use of non-linear resistors in series with the pulse train path. Any other suitable network which will distort the pulses in the desired manner may be used in tandem with the sampling or gating circuit without departing from the spirit of the invention.

Figure 3:
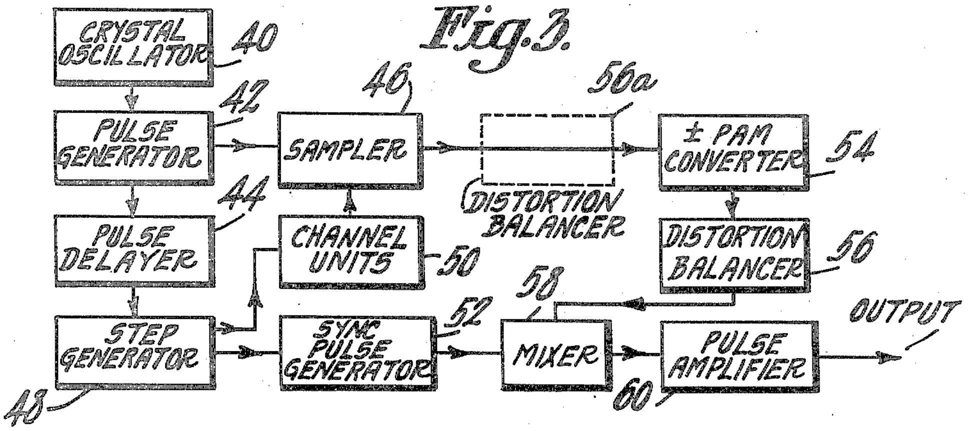
Fig. 3 represents in block diagram a time division multiplex transmitter incorporating the invention.

By way of example, there is shown in Fig. 3 an embodiment of the invention as one manner in which it may be used in the transmitting end of a time division multiplex system. In this embodiment of the invention, the basic timing circuit is a crystal oscillator 40 which is used to lock-in a pulse generator 42. The pulses from the pulse generator 42 are coupled to a pulse delay network 44 and a gating or sampling circuit 46. The delayed pulses from the pulse delayer 44 are coupled to a step wave generator 48 which produces a step wave which controls the channel units 50. The step wave generator also produces pulses at the end of each cycle of the step wave which are coupled to the synchronizing pulse generator 52. The signal pulse train from the sampler 46 is applied to ± pulse amplitude modulated (±PAM) converter 54. The function of the ±PAM converter is to convert single polarity pulses to double polarity pulses whose magnitude and phase depends upon the amplitude and polarity of the modulating voltage. The output of the ±PAM converter 54 is, in accordance with the invention, fed through a distortion balancer 56 which may take the form of the arrangement shown in Fig. 2. The distortion balanced pulse signal train and the output of the sync pulse generator 52 are fed to a mixer 58 where the composite pulse signal train with the synchronizing pulses added is produced. The composite pulse signal may be amplified by an amplifier 60 prior to transmission. For a more detailed description of the type of circuits which may be used for the components in this arrangement (for example the ±PAM converter) and the overall operation thereof, reference may be had, by way of example to United States Patents 2,480,137 granted August 30, 1949 and 2,518,013 granted August 8, 1950 to the present inventor and to my copending application Serial No. 786,286, filed November 15, 1947, now United States Patent 2,543,738, granted February 27, 1951.

While the distortion balancer 56 has been shown in the arrangement of Fig. 3 as being placed after the ±PAM converter 54, it is equally advantageous to place it before the converter as shown by the dotted box 56a in which case the output from the ±PAM converter will be fed directly to the mixer 58. Furthermore, a separate distortion balancer may be provided for each channel unit without departing from the spirit of the invention. However, by utilizing double gating and a single distortion balancer which acts upon all pulses, the benefits of the invention may be achieved at minimum cost and complexity of equipment. Another advantage of having the distortion balancing following the second gating circuits is that slight changes in channel adjustments, which normally affect only the leading and trailing edges of the channel output pulses do not affect the distortion balance since the second sampling circuit samples only the center portion of the pulses produced by the channel units.

The manner in which double gating and distortion balance is obtained in accordance with the invention will be explained in more detail in conjunction with Fig. 4. There is shown within the dotted lines 70 an illustrative example of one type of channel unit which may be used with the invention. A step voltage wave, as shown in Fig. 4*a*, is coupled to the grid of a normally non-conducting position selector vacuum tube 72 through a current limiting resistor 74. For the purpose of simplicity only 4 channel units have been considered. It is to be understood that any number of channel units may be used without departing from the spirit of the invention. The tube 72 is biased to become conducting on a particular riser in the applied step voltage wave signal by means of a direct current voltage developed across the by-passed cathode potentiometer 75. That is, each time the tube 72 conducts, an electron charge is stored in the by-pass condenser 76, and for the time interval during which the tube 72 is non-conducting, the charge stored on the condenser 76 starts to leak off through the cathode potentiometer 75, developing a bias thereacross sufficient to maintain the tube 72 cut off. The time constant of the condenser 76 and the potentiometer 75 is made of a value such that there is little change in the voltage developed across the potentiometer 75, for the time interval during which the tube 72 is inoperative.

The voltage amplitude of the riser upon which the tube 72 is biased to become operative is sufficient to drive the grid of the tube from below cut-off to a zero grid-to-cathode potential condition. As the amplitude of the applied step wave increases above the value at which the zero grid-to-cathode potential condition is reached, there is no appreciable increase in anode current in the tube 72, since the grid limiting resistor 74 maintains the grid-to-cathode potential at zero. The result is that a voltage wave as shown in Fig. 4*b* is developed at the anode of the tube 72. That is, the anode potential remains at a high value until the tube 72 starts to conduct, at which time it suddenly drops to a low value and remains at this low value for the succeeding voltage increases in the step wave cycle. The dashed line $x$ in Fig. 4*a* indicates the cut-off voltage on the grid of the tube 72 and the dashed line $y$ indicates the voltage at which the zero grid-to-cathode potential is reached, when the tube 72 is biased to operate on the number 3 step riser. By varying the tap on the cathode potentiometer 75, the tube 72 may be made to operate on any desired riser.

As explained in conjunction with Fig. 1, electron current, which normally flows through the resistor 14, diode 12 and inductance 77 produces a voltage across the resistor 14 sufficient to maintain the pulse modulator tube 10 cut-off for all levels of input signal. The condenser 78 and inductance 77 form a series tuned circuit coupled to the anode circuit of the tube 72. When the anode current in the tube 72 suddenly increases, the tuned circuit starts to oscillate and swings negative, due to electron current flowing into the condenser 78, causing the anode potential of the diode 12 to be reduced to a value lower than its cathode. The diode 12 then ceases conducting with the result that the cut-off bias is removed from the pulse modulator tube 10 and the tube operates as a conventional class A amplifier for a short time interval. When the voltage developed across the condenser 78 and the inductance 77 swings positive, the diode 12 again conducts and cause the tube 10 to cut-off. At the same time, damping is impressed across the tuned circuit, dissipating the energy stored therein. Due to the current drawn by the tube 10, a negative pulse is developed across the load resistor 16 which is common to all channels. The amplitude of the pulse developed across the load resistor 16 is a function of the audio signal applied to the grid of the tube 10 and the duration of the pulse is a function of the conducting time of the tube 10 which, in turn, is a function of the cut-off time of the diode 12. Fig. 4*c* shows the half cycle of oscillation developed at the anode of the diode 12. The horizontal line Z indicates the potential below which the tube 10 becomes operative. Fig. 4*d* shows the negative gating impulses developed across the resistor 14.

The other channel units similarly produce amplitude modulated pulses the amplitude of which varies as a function of the audio signals applied to them. However, since each is gated into operation upon a different riser of the step wave voltage the pulses will be produced in separate different time intervals. Since the output of all channels appears across the common load resistor 16, there is produced there-across the sequential series of pulses which form the pulse series train. As explained above, these pulses will be distorted. By means of a second sampling cirucit similar to that shown in Fig. 1 and as described in detail above, the second gating is made to occur during the linear portion of the pulses. The second sampler, shown within the dotted lines 80, is similar in operation and construction to the sampler shown in Fig. 1 and no further explanation of its operation is believed warranted here. Fig. 4*e* shows the gating pulses applied to the second sampler arrangement. It will be noted that since a complete pulse train is being sampled, gating pulses are provided for each channel time interval.

As explained above, while the use of double gating reduces distortion, some distortion still remains. In accordance with the invention, a distortion introducing circuit is provided within the dotted lines 90 which adds a predetermined amount of distortion which balances the inherent distortion. The distortion introducing circuit may take the form of that shown in Fig. 2 and is shown as such in the embodiment shown in Fig. 4. The construction and operation of this arrangement has been fully described and will be apparent from that description.

Referring now to Fig. 5, there is shown an embodiment of the invention as applied to a conventional time position multiplex receiver. Such receivers are well known in the art, one example thereof being shown in United States Patent No. 2,469,066 granted May 3, 1949 to J. R. Day. It is to be understood that the embodiment shown in Fig. 5 is by way of example only, since the invention may be applied to any conventional multiplex receiver using sampling principles. In the arrangement shown in Fig. 5, the pulse signal train from the receiver 100 is fed to a distortion balancing arrangement shown within the dotted lines 101. The tube 26 operates as that shown in Fig. 2 and adds a predetermined amount of distortion to the incoming pulses and couples the resulting signal as shown in wave form 103 to the grid of the sampling tube 10 which operates in a manner identical to that shown in Fig. 1. The sampling tube 10 samples each pulse from the distortion balancer and the resulting pulse train as shown in wave form 105 is coupled to the receiving channel units not shown.

The pulse generator consists of a normally non-conducting vacuum tube 108, a pulse transformer 109, a grid blocking condenser 110, and a grid leak 111. The tube 108 and its associated circuitry form a free-running pulse oscillator. The frequency of the output pulses from the oscillator is controlled by applying to it a locking signal voltage at a frequency slightly higher than the free running frequency of the oscillator through the injector tube 120. The locking signal voltage is obtained from the frequency control unit 125 and is maintained in proper phase and frequency by the synchronizing signals in the received signal train.

A portion of the pulse output from the oscillator tube 108 is fed to the step wave generator comprising tubes 130, 133, and 135. Each time the tube 108 conducts, an electron charge is stored in condenser 137. Since there is no D.-C. impedance across the condenser 137, the charge remains therein until the occurrence of the next succeeding pulse at which time an additional charge is stored in the condenser 137. This results in a corresponding series of steps of voltage being applied to the grid of the normally non-conducting tube 133 through a pulse transformer 139. This action is continued until the grid of the tube 133 is made positive with respect to its cathode, at which time grid current flows resulting in the discharge of the condenser 137. The transformer 139 is so poled as to aid this action which continues until the tube 133 is again cut-off. The next succeeding pulse appearing on the grid of the tube 133 starts a new step wave or commutating cycle. The tube 135 acts as a cathode follower stage which couples the step wave to the channel units. The horizontal dotted line N in the step wave 140 represents the voltage at which the tube 133 conducts.

The pulses as shown in wave form 149 from the oscillator tube 108 are also coupled to a tube 150. The horizontal dotted line P indicates the potential at which the tube 150 becomes conducting. Each time the tube 150 conducts, a damped cycle of oscillation is produced as shown in wave form 155. This wave is applied to the gate pulse tube 160. The horizontal dashed line M of wave form 155 represents the voltage at which the tube 160 conducts. The frequency of the oscillating voltage developed across the tube 150 is such that the tube 160 becomes operative a predetermined time interval following the pulses produced by the oscillator tube 108. These pulses are used to gate the sampler tube 10 so as to sample the center of the applied pulses. The sample pulses are supplied to the channel unit through amplifier tube 165.

Since the signal pulses were passed through the distortion introducing arrangement shown within the block 101 prior to being sampled, the distortion inherently produced by the sampler will be balanced and true pulse signals will be fed to the channel receiving units.

What is claimed is:

1. In pulse communications in which sampling is effected to produce pulses representative of the signal intelligence, the method of reducing the distortion inherently resulting from the sampling process due to the non-linearity in the sampling vacuum tube when shifted between cut-off and conductive conditions, comprising, the successive steps of resampling within the effective period of the first said sampling, and intentionally distorting the pulses produced by the said resampling to a degree equal and opposite to that inherently produced by said resampling.

2. In time division multiplex signalling in which a plurality of separate pulse trains representative of signal intelligence are formed by sampling and the separate pulse trains are combined in spaced time relation to form a composite pulse train, the method of reducing the distortion produced as a result of the non-linearity in a sampling vacuum tube when shifted between the cut-off and conductive conditions, comprising the steps of, resampling the composite pulse train within the effective period of said first sampling, thereby substantially eliminating the inherent distortion introduced by said first sampling and inherently producing additional and lesser distortion, and subsequently intentionally distorting the pulses produced by the said resampling to a degree equal and opposite to that inherently produced by said resampling.

3. In time division multiplex signalling in which a plurality of separate inherently distorted pulse trains each representative of a separate source of signal intelligence are formed by sampling and the separate pulse trains are combined in spaced time relation to form a composite pulse train, the method of reducing the distortion inherently produced due to the non-linearity in a sampling vacuum tube when shifted between the cut-off and conductive conditions, comprising the steps of, resampling the composite pulse train within the effective period of said first sampling to form a common train of pulses, thereby substantially eliminating the inherent distortion introduced by said first sampling and inherently producing additional and lesser distortion, and intentionally distorting the pulses of said common train prior to said resampling to a degree equal and opposite to that inherently effected by said resampling.

4. A time division pulse multiplex communication system including a plurality of signal translating channels, a common signal transmission channel, an electronic commutator coupling said signal translating channels to said common signal channel to sequentially assign said signal translating channels to said common signal transmission channel to apply spaced message pulses thereto for trasmission, an electronic discharge device gating circuit interposed in said common signal transmission channel, said gating circuit being opened only intermediate the width limits of said spaced signal pulses to transmit narrower time-spaced signal pulses over said common signal transmission channel, said gating circuit distorting said signal pulses to a given extent, a distortion producing circuit interposed in tandem in said common signal transmission channel to distort said signal pulses to an extent substantially equal and opposite in nature to said given extent.

5. A time division pulse multiplex communication system including a plurality of signal translating channels, a common signal transmission channel, an electronic commutator coupling said signal translating channels to said common signal channel to sequentially assign said signal translating channels to said common signal transmission channel to apply spaced message pulses thereto for transmission, an electronic discharge device gating circuit interposed in said common signal transmission channel, said gating circuit being opened only intermediate the width limits of said spaced signal pulses to transmit narrower time-spaced signal pulses over said common signal transmission channel, said gating circuit distorting said signal pulses to a given extent due to the transition of the electron discharge device from the blocked condition through a non-linear conducting condition to a linear conducting condition, an electron discharge device amplifier having an input circuit and having an output circuit interposed in said common signal transmission channel, means to apply operating potential to said electron discharge amplifier device to operate the same in a non-linear conducting condition at which said signal pulses are distorted at said output circuit to an extent substantially equal and opposite in nature to said given extent.

6. A time division pulse multiplex communication system including a plurality of message translating channels, a common message transmission channel, an electronic commutator coupling said message translating channels to said common message channel to sequentially assign said message translating channels to said common message transmission channel to apply spaced message pulses thereto for transmission, an electronic gating circuit interposed in said common message transmission channel, said gating circuit being opened only intermediate the width limits of said spaced message pulses to transmit narrower spaced message pulses over said common message transmission channel, said gating circuit distorting said message pulses to a given extent, a distortion compensating network interposed in tandem in said common message transmission channel and having a non-linear response to the applied message pulses to distort said message pulses to an extent substantially equal and opposite in nature to said given extent.

7. A time division pulse multiplex communication system including a common message transmission channel, means to apply spaced message pulses to said common message channel for transmission, an electronic gating circuit interposed in said common message transmission channel, said gating circuit comprising an electron discharge device opened only to transmit time spaced message pulses over said common message transmission channel, said gating circuit distorting said message pulses to a given extent due to the transition from the blocked condition through a non-linear conducting state to a linear conducting state, a compensating network interposed in said common message transmission channel, an electron discharge device having a cathode, an anode and a control electrode, means including a variable resistance for supplying operating potentials to said anode, means including a variable resistance connecting said cathode to a point of fixed reference potential, means for coupling said pulses to said control electrode, and an output circuit connected to said anode, said operating potentials and said variable resistors being so adjusted to distort said message pulses to an extent substantially equal and opposite in nature to said given extent.

8. A time division pulse multiplex communication system including a common message transmission channel, means to apply spaced message pulses to said common message channel for transmission, an electronic gating circuit interposed in said common message transmission channel, said gating circuit comprising an electron discharge device opened only to transmit time spaced message pulses over said common message transmission channel, said gating circuit distorting said message pulses to a given extent due to the transition from the blocked condition through a non-linear conducting state to a linear conducting state, a compensating network interposed in said common message transmission channel, an electron amplifier having an electron source electrode, a control electrode and an output electrode, means for supplying operating potentials to said output electrode including a series connected variable resistor and fixed resistor connected to said output electrode, a variable resistor connected between said electron source electrode and a point of fixed reference potential, means connected to said control electrode for coupling said pulses to said control electrode, an output circuit connected between said output electrode and said point of fixed reference potential, and a by-pass condenser connected between the junction of said variable and fixed resistor and said point of fixed reference potential, said operating potentials and the parameters of said electron amplifier being so related to distort said message pulses to an extent substantially equal and opposite in nature to said given extent.

9. In a time division multiplex transmitting terminal, a source of a pulse train wherein each successive pulse in a cycle of pulses in amplitude modulated according to a message signal, a source of a gating pulse wave, a normally non-conducting gate tube circuit receptive to said pulse train, means to apply said gating pulse wave to said gate tube circuit to render said tube conductive during a portion of the time the tube is receptive to each pulse of the pulse train, said gating process resulting in distortion due to the non-linearity in the gating tube when shifted between the cut-off conductive conditions, and a distortion balancing vacuum tube circuit receptive to the output of said gating circuit and biased to introduce a balancing distortion which cancels said first named distortion.

10. In a time division multiplex transmitting terminal, a source of a pulse train wherein each successive pulse in a cycle of pulses is amplitude modulated according to an individual audio message signal, a source of a gating pulse wave synchronous with said pulse train, a normally non-conducting gate tube circuit receptive to said pulse train, means to apply said gating pulse wave to said gate tube circuit to render said tube conductive during a portion of the time the tube is receptive to each pulse of the pulse train, said gating process resulting in the generation of frequencies which are harmonics of the message signals, and a distortion balancing vacuum tube circuit receptive to the output of said gating circuit and biased to generate frequencies the same as said harmonic frequencies but 180 degrees out-of-phase therewith, whereby said harmonic frequencies are cancelled from the output of said distortion balancing vacuum tube circuit.

11. In a time division multiplex receiving terminal, a source of a pulse train wherein each successive pulse in a cycle of pulses is amplitude modulated according to an individual audio message signal, a source of a gating pulse wave synchronous with said pulse train, a distortion generating vacuum tube circuit receptive to said pulse train, a normally non-conducting gate tube circuit receptive to the output of said distortion generating circuit, means to apply said gating pulse wave to said gate tube circuit to render said tube conductive during a portion of the time the tube is receptive to each pulse of the pulse train, said distortion producing vacuum tube circuit being biased to generate frequencies which are substantially 180 degrees out-of-phase with the frequencies which result from the gating process due to the non-linearity in the gating tube when it is shifted between cut-off and conductive conditions, whereby the distortion generated in the distortion producing vacuum tube circuit and in the gating tube circuit are made to cancel each other and are prevented from appearing in the output of the gating tube circuit.

12. In a time division multiplex terminal, a source of a pulse train wherein each successive pulse in a cycle of pulses is amplitude modulated according to an individual message signal, a source of a gating pulse wave synchronous with said pulse train, a single signal path for said pulse train, a normally non-conducting gate discharge device circuit in said signal path, means to apply said gating wave to said gate circuit to render said discharge device conductive during a portion of the time the device is receptive to each pulse of the pulse train, said gating process resulting in distortion due to the non-linearity in the gating device when shifted between cut-off and conductive conditions, a distortion balancing discharge device circuit also disposed in said signal path, and means to bias said distortion balancing discharge device to introduce a balancing distortion which cancels said distortion resulting from the gating process.

References Cited in the file of this patent

UNITED STATES PATENTS

| | | |
|---|---|---|
| 2,414,546 | Nagel | Jan. 21, 1947 |
| 2,516,587 | Peterson | July 25, 1950 |
| 2,530,538 | Rack | Nov. 21, 1950 |
| 2,576,137 | Newitt | Nov. 27, 1951 |
| 2,579,071 | Hansell | Dec. 18, 1951 |